United States Patent
Kashiwaba et al.

(10) Patent No.: US 6,738,198 B2
(45) Date of Patent: *May 18, 2004

(54) OPTICAL-ELEMENT HOLDING MECHANISM, IMAGE-SHAKE CORRECTING DEVICE AND OPTICAL APPARATUS

(75) Inventors: Seiichi Kashiwaba, Tokyo (JP); Koichi Washisu, Tokyo (JP); Shigeki Sato, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,339

(22) Filed: Jan. 25, 1999

(65) Prior Publication Data

US 2002/0018296 A1 Feb. 14, 2002

(30) Foreign Application Priority Data

Jan. 29, 1998 (JP) ............................................. 10-017138
Jan. 29, 1998 (JP) ............................................. 10-017139

(51) Int. Cl.⁷ .......................... G02B 15/14; G03B 17/00
(52) U.S. Cl. ...................... 359/704; 359/703; 359/694; 396/72
(58) Field of Search ................................ 359/694–706, 359/813–830; 396/72–83

(56) References Cited

U.S. PATENT DOCUMENTS

| | | | | |
|---|---|---|---|---|
| 4,105,282 A | * | 8/1978 | Schael | 359/364 |
| 4,780,640 A | * | 10/1988 | Hasegawa | |
| 4,869,108 A | | 9/1989 | Washisu | 73/517 B |
| 4,889,406 A | * | 12/1989 | Sezerman | |
| 4,965,619 A | | 10/1990 | Shikaumi | 396/52 |
| 5,020,369 A | | 6/1991 | Washisu | 73/517 A |
| 5,054,886 A | * | 10/1991 | Ozaki et al. | 359/823 |
| 5,402,202 A | | 3/1995 | Washisu | 396/55 |
| 5,602,675 A | | 2/1997 | Okada | 359/554 |
| 5,608,703 A | | 3/1997 | Washisu | 396/55 |
| 5,652,922 A | * | 7/1997 | Kohno | 396/72 |
| 5,700,103 A | * | 12/1997 | Tsai | 403/260 |
| 5,715,481 A | * | 2/1998 | Ohmiya | 396/79 |
| 5,737,644 A | * | 4/1998 | Nomura et al. | 396/72 |
| 5,774,266 A | | 6/1998 | Otani et al. | 359/554 |
| 5,826,307 A | * | 10/1998 | Chin-Fu | 16/340 |
| 5,835,799 A | | 11/1998 | Washisu | 396/55 |

FOREIGN PATENT DOCUMENTS

| | | |
|---|---|---|
| JP | 6-289465 | 10/1994 |
| JP | 9-43661 | 2/1997 |

* cited by examiner

Primary Examiner—Thong Q. Nguyen
(74) Attorney, Agent, or Firm—Fitzpatrick, Cella, Harper & Scinto

(57) ABSTRACT

An optical-element holding mechanism includes a first holding member arranged to hold a first optical element, a second holding member arranged to hold a second optical element, a coupling member arranged to couple the first and second holding members with each other and to permit relative positions of the first and second holding members to be varied in process of being coupled, and an urging member disposed between the coupling member and the second holding member and arranged to urge and press the second holding member against the first holding member at least when the coupling member is in process of coupling the first and second holding members. Further, an image-shake correcting device mounted on an optical apparatus includes a body member, and a lens unit arranged to be moved with respect to the body member in a direction orthogonally intersecting an optical axis for correcting an image shake, wherein the body member is provided with a recessed part formed in a periphery thereof to insert therein a member which extends before and after the body member in a direction of an optical axis and which constitutes the optical apparatus.

10 Claims, 9 Drawing Sheets

OPTICAL-ELEMENT HOLDING MECHANISM, IMAGE-SHAKE CORRECTING DEVICE AND OPTICAL APPARATUS

BACKGROUND OF THE INVENTION

1. Field of the Invention

The present invention relates to an optical-element holding mechanism and an image-shake correcting device adapted for use in an optical apparatus, such as an interchangeable lens for a single-lens reflex camera or the like.

2. Description of Related Art

To correct deterioration of lens performance resulting from manufacturing error, it has generally been practiced to arrange the lens-holding mechanisms of interchangeable lenses of single-lens reflex cameras to be suited for correcting optical axis deviations of lenses during a manufacturing process, i.e., for adjusting relative positions of a plurality of optical elements in a direction orthogonally intersecting an optical axis. The typical arrangement of the conventional lens-holding mechanism and a method generally employed for correction of the optical axis deviation are described below.

FIG. 1 shows the lens-holding mechanism which forms a part of a conventional interchangeable lens for a single-lens reflex camera. Referring to FIG. 1, a guide tube 1 is kept in a fixed position with respect to a film surface. A guide slot 1a is formed in the guide tube 1 to extend in the direction of an optical axis. A cam tube 2 is fitted on the outer side of the guide tube 1 in such a way as to be only rotatable around the optical axis. A cam slot 2a is formed in the cam tube 2.

A first lens tube 3 holds a first lens 5 and has its outer side fitted in the inner side of the guide tube 1. A roller 4 which engages the guide slot 1a and the cam slot 2a is attached to the first lens tube 3 with a screw. When the cam tube 2 is rotated around the optical axis, the roller 4 is moved accordingly at an intersection point of the guide slot 1a and the cam slot 2a to cause the first lens tube 3 to move in the direction of the optical axis.

A second lens tube 6 holds a second lens 7. The second lens tube 6 abuts on the rear end face of an arm part of the first lens tube 3 extending rearward in the direction of the optical axis and is secured to the arm part by a screw 9. The second lens tube 6 is thus arranged to move integrally with the first lens tube 3 when the first lens tube 3 moves in the direction of the optical axis.

In the lens-holding mechanism which is arranged in this manner, the relative positions of the first lens tube 3 and the second lens tube 6 are not exactly decided in the direction orthogonally intersecting the optical axis. In this direction, their positions are arranged to be roughly determined within a certain range. By virtue of this arrangement, optical axis deviations (eccentric deviations) of the first lens 5 and the second lens 7, due to manufacturing errors of parts, can be corrected by adjusting the position of the second lens tube 6 relative to the first lens tube 3 in the direction orthogonally intersecting the optical axis in assembling them.

The method for adjusting and correcting the optical axis deviation of the lens-holding mechanism during a manufacturing process is next described. In making the adjustment, the guide tube 1 is secured to an adjustment tool body (not shown) before the second lens tube 6 and the first lens tube 3 are fixed in position with the screw 9. Then, an adjustment tool 8 which is composed of an adjustment ring 8a, an urging ring 8b and an urging spring 8c is set. The adjustment ring 8a is fitted on the outer side of the lens holding part of the second lens tube 6. Then, the adjustment ring 8a is movable with respect to the adjustment tool body in the direction orthogonally intersecting the optical axis. The urging ring 8b is fitted in the inner side of the adjustment ring 8a and is urged toward the second lens tube 6 by the urging spring 8c which is disposed between the adjustment ring 8a and the urging ring 8b.

Therefore, the second lens tube 6 is held in a state of being pressed against the first lens tube 3 by the urging ring 8b. In other words, the first lens tube 3 and the second lens tube 6 are kept in a state of being spaced at a fixed distance in the direction of the optical axis.

The above-stated optical axis deviation can be corrected by moving the adjustment ring 8a in the direction orthogonally intersecting the optical axis to bring the second lens tube 6 to a desired position in this direction. After the second lens tube 6 is moved, by using the adjustment tool 8, to the position where the optical axis deviations of the two lenses 5 and 7 are corrected, the screw 9 is tightened to couple the first lens tube 3 and the second lens tube 6 with each other in a state of having no optical axis deviation.

However, the conventional optical axis deviation correcting method has the following shortcomings.

Firstly, since the second lens tube 6 is arranged to be urged toward the first lens tube 3 by the urging ring 8b, the urging force is exerted on the first lens tube 3 or the abutting part of the cam slot 2a and the roller 4. Then, the optical axis deviation is corrected in a state of having the first lens tube 3 and the roller 4 deformed by the urging force. Therefore, the instant the urging force by the urging ring 8b is removed, the deformed parts tend to resume their original shapes to bring back the optical axis deviation. In this state, the optical axis deviation can be hardly considered to have been accurately corrected in actuality.

Secondly, the accuracy of correction deteriorates due to deformation of parts taking place when the screw 9 is tightened. For example, at the first lens tube 3, a part around the screw 9 is deformed by the tightening frictional force of the screw 9, particularly in a case where a self-tapping screw is employed as the screw 9. At the second lens tube 6 also, a part around the screw 9 is deformed by the frictional force of the head part of the screw 9. If the adjustment tool 8 is removed in the state of having such deformation, the second lens tube 6 tends to move in the direction of moderating a stress generated by the deformation. The optical axis deviation thus hardly can be considered to have been accurately corrected also in this respect.

Thirdly, a frictional force generated at the abutting faces of the first lens tube 3 and the second lens tube 6 while the position of the second lens tube 6 is in process of correcting adjustment also causes deformation of the first lens tube 3, which also deteriorates the accuracy of the correction.

Meanwhile, cameras are arranged nowadays to automatically perform all actions important for photo-taking, such as determining an exposure, focus adjustment, etc. Even a person who is unaccustomed to operating cameras, therefore, can take photographs with little possibility of failure.

Besides, factors of photographing failures have been almost completely eliminated by recent advancement of efforts to develop a system for correcting image shakes that often result from vibrations imparted to cameras.

Here, the system for correcting image shakes resulting from vibrations is briefly described. In taking photographs, the hands holding the camera generally vibrate within a frequency range from 1 Hz to 12 Hz. In order to take a photograph without any image shake despite such vibrations at the time of a shutter release, it is a basic concept to detect the vibration of the camera and then to vary the position of a correction lens according to the value of the vibration detected.

Therefore, in order to make it possible to take a photograph without image shakes under such condition, it is necessary to accurately detect the vibration of the camera and then to correct a change of the optical axis caused by the vibration of the camera by displacing a correction lens.

Theoretically, the vibration of the camera can be detected by means of a vibration detecting means for detecting acceleration, velocity, or the like and a displacement signal output means for outputting a displacement signal obtained by electrically or mechanically integrating a signal outputted from the vibration detecting means. The image shakes then can be corrected by displacing the correction lens on the basis of the displacement signal to vary a photo-taking optical axis as required.

An image-shake correcting system which uses such a vibration detecting means is next described in outline. FIG. 2 shows by way of example the arrangement of the image-shake correcting system. In the case of the system shown in FIG. 2, the system is arranged to suppress image shake of the camera taking place in the directions of arrow 81, including a vertical vibration 81$p$ (direction of pitch) and a horizontal direction 81$y$ (direction of yaw).

In FIG. 2, reference numeral 82 denotes a lens barrel. Vibration detecting means 83$p$ and 83$y$ are arranged to detect respectively the vibration in the directions of arrows 84$p$ and 84$y$. A lens holding member 85 is arranged to hold a correction lens. Coils 87$p$ and 87$y$ are arranged to impart a thrust to the lens holding member 85. Detecting elements 86$p$ and 86$y$ are arranged to detect the position of the lens holding member 85. A position control loop is formed jointly by these parts. The stability of an image on an image plane 88 is secured with the lens holding member 85 driven according to the outputs of the vibration detecting means 83$p$ and 83$y$ which are used as target values.

Further, there have been developed image-shake correcting devices of varied kinds (as disclosed in, for example, Japanese Laid-Open Patent Application No. HEI 6-289465 which corresponds to U.S. Pat. No. 5,602,675).

The appearances of these image-shake correcting devices present cylindrical shapes as shown in Japanese Laid-Open Patent Application No. HEI 9-43661, etc. The body part of each of these devices includes a driving part for a lens and a part for driving a lock means to lock and unlock the movement of the lens.

However, the conventional image-shake correcting device is arranged to be secured to a fixed member within an optical apparatus and to be immovable in the direction of the optical axis in many cases. Such an arrangement has imposed some limitation on the optical design of the apparatus.

Further, in the case of an optical system having lens units disposed respectively before and after an image-shake correcting device arranged to be movable together, it is necessary to interlink the front and rear lens units with each other across the image-shake correcting device. However, if the conventional image-shake correcting device of the cylindrical external shape is used for such an optical system, the use of the image-shake correcting device necessitates a member used for interlinking the front and rear lens units to be disposed further outside of the outer side of the image-shake correcting device. Beside, a lens driving part and a lock-member driving part arranged in parallel with the optical axis prevent the optical apparatus from having recessed parts or hole parts provided by using dead spaces for preventing an increase in size. Therefore, the outside diameter of the optical apparatus inevitably becomes larger.

BRIEF SUMMARY OF THE INVENTION

A first object of the invention is to provide an optical-element holding mechanism which can be simply arranged to be capable of accurately correcting deviation of an optical axis.

A second object of the invention is to provide an image-shake correcting device which is arranged to integrally interlink lens units disposed before and after the image-shake correcting device and to be movable in the direction of an optical axis without necessitating any increase in outside diameter thereof.

To attain the above objects, according to a first aspect of the invention, there is provided an optical-element holding mechanism, which comprises a first holding member arranged to hold a first optical element, a second holding member arranged to hold a second optical element, a coupling member, such as a screw, arranged to couple the first and second holding members with each other and to permit relative positions of the first and second holding members to be varied in process of being coupled, and an urging member disposed between the coupling member and the second holding member and arranged to urge and press the second holding member against the first holding member at least when the coupling member is in process of coupling the first and second holding members.

The optical-element holding mechanism is preferably arranged to prevent deterioration of accuracy of correction of an optical axis deviation resulting from deformation of the first holding member by mounting a deformation restricting member arranged to restrict the deformation of the first holding member taking place in varying the relative positions of the first and second holding members and also when the coupling member is in the process of coupling the first and second holding members.

It is also preferable to prevent deterioration of accuracy of correction of an optical axis deviation resulting from deformation of the second holding member by arranging a friction preventing member between the coupling member and the second holding member to prevent generation of a frictional force by the coupling action of the coupling member between the coupling member and the second holding member. Further, the friction preventing member is preferably arranged to have its movement restricted, with respect to the first holding member, within a plane of varying the relative positions of the first and second holding members and also to be movable together with the first and second holding members after completion of assembly work.

The friction preventing member may be arranged to serve also as the deformation restricting member, and the urging member may be disposed between the coupling member and the friction preventing member. Deformation of parts thus can be efficiently prevented by simple arrangement.

Further, to attain the above objects, according to a second aspect of the invention, there is provided an image-shake correcting device mounted on an optical apparatus and arranged to move a lens relative to a body member in a direction orthogonally intersecting an optical axis, the image-shake correcting device having a recessed part formed in a peripheral part of the body member to allow a component member of the optical apparatus extending before and after the body member in a direction of the optical axis, such as a member arranged to interlink optical elements disposed before and after the image-shake correcting device, to be located inside of the recessed part.

More specifically, the image-shake correcting device comprises a body member, lens driving means mounted on the body member and arranged to drive a lens, a lock member arranged to lock and unlock the movement of the lens by moving relative to the body member, and lock driving means for driving the lock member, wherein a recessed part is formed in a part of a peripheral part of the body member, other than parts where the lens driving means and the lock driving means are mounted on the body member.

Further, the image-shake correcting device and, therefore, the whole optical apparatus, can be compactly arranged, for example, by arranging a restricting part in a dead space available on the inner side of the recessed part, to restrict the movement of the lens in the direction of the optical axis and also by arranging the lens driving means and the lock driving means approximately within one and the same plane orthogonally intersecting the optical axis.

These and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.
(First Embodiment)

Figure 3:
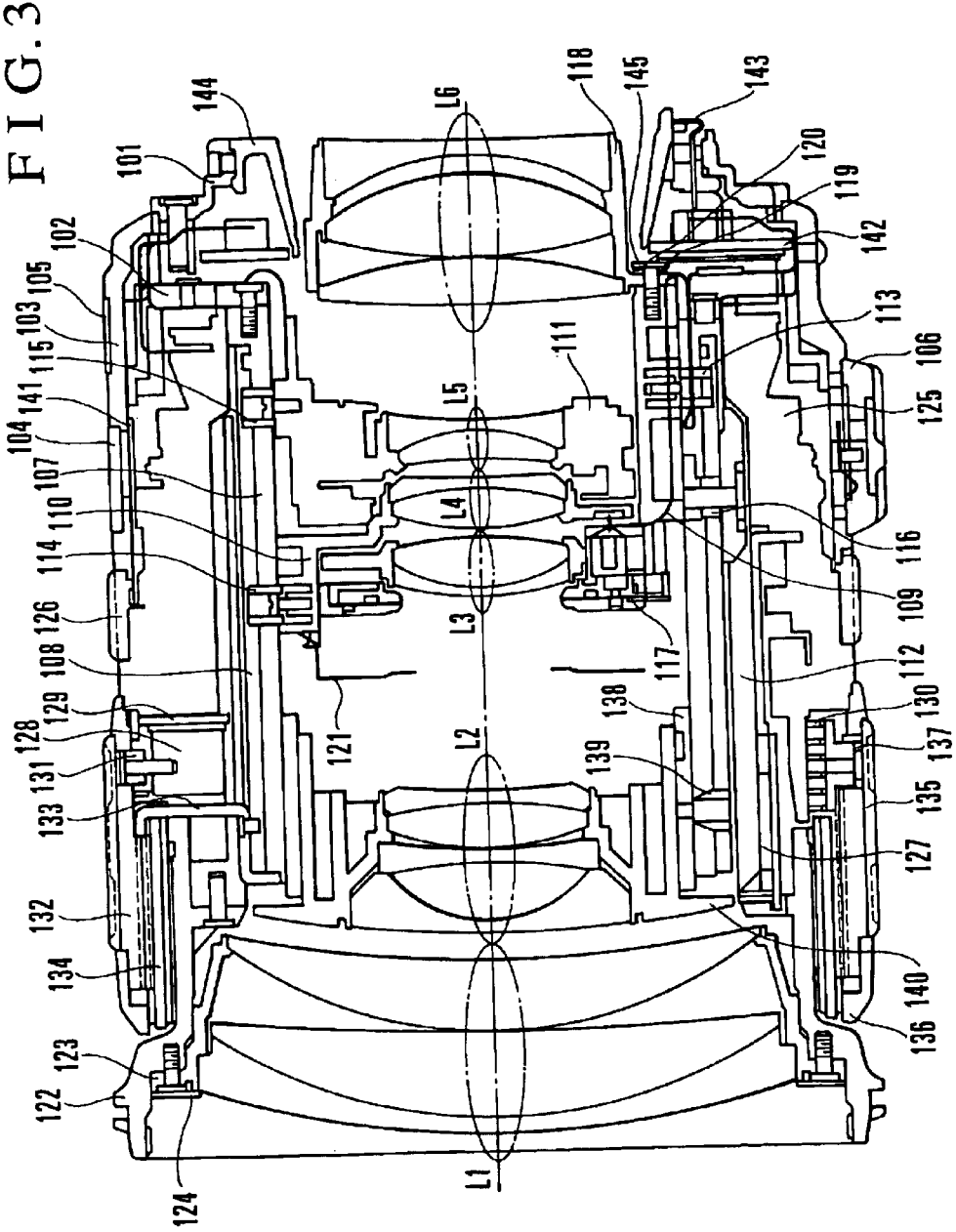
FIG. 3 is a sectional view showing the arrangement of an interchangeable lens adapted for a single-lens reflex camera, according to a first embodiment of the invention.

FIG. 3 is a sectional view showing the internal arrangement of an interchangeable lens (optical apparatus) arranged for a single-lens reflex camera to include a lens holding mechanism (optical-element holding mechanism), according to a first embodiment of the invention. The interchangeable lens is composed of six lens units including first to sixth lens units L1 to L6. All the lens units L1 to L6 are arranged to be movable in the direction of an optical axis by a zooming action. The second lens unit L2 is arranged to be movable by a focusing action.

Of these lens units, the third lens unit L3 and the sixth lens unit L6 are arranged to move together, while the fifth lens unit L5 is arranged not only to move in the direction of the optical axis but also to be movable in a direction orthogonally intersecting the optical axis by an image-shake correcting action.

A mount 101 has a bayonet part for mounting the lens (barrel) on the body of the camera. The mount 101 is secured to a fixed tube 102 with screws. An exterior ring 103 is interposed in between the mount 101 and the fixed tube 102 and is fixed there.

A graduation window 104, a name plate 105 and a switch panel 106 are mounted on the exterior ring 103. An automatic focusing function, an image-shake correcting function or some other function is selectable by operating a switch provided on the switch panel 106.

A guide tube 107 forms a part fixed with respect to the camera body in conjunction with the fixed tube 102 which is fixed by screws. A cam tube 108 is fitted on the outer side of the guide tube 107 in such a way as to be only rotatable around the optical axis. An intersection point between a guide groove (slot) formed in the guide tube 107 to extend in the direction of the optical axis and a cam groove (slot) formed in the cam tube 108 moves when the cam tube 108 is rotated. By rotating the cam tube 108, a third lens unit holding frame 109 which holds the third lens unit L3, a fourth lens unit holding frame 110 which holds the fourth lens unit L4, an image-shake correcting unit 111 and a rectilinear motion tube 112 can be moved in the direction of the optical axis respectively through rollers 113 to 116 which are secured to them with screws accordingly as the intersection point moves.

An electromagnetic diaphragm unit 117 which is composed of a diaphragm driving part and a diaphragm blade part is secured with a screw to the third lens unit holding frame 109. A sixth lens unit holding frame 118 which holds the sixth lens unit L6 is secured with screws 145 to the rear end of the third lens unit holding frame 109 together with a reinforcing plate 119 and washers 120. A hook part is provided at the front end of the fourth lens unit holding frame 110. A moving stop 121 which defines a maximum (full open) aperture and is provided for the purpose of cutting any deleterious light is elastically coupled with the hook part from its front side. Such an arrangement facilitates coupling work on the moving stop 121 and the fourth lens unit holding frame 110 in a state of having the third lens unit holding frame 109 interposed in between them.

The image-shake correcting unit 111 is arranged to hold the fifth lens unit L5 in such a way as to make it drivable in a direction orthogonally intersecting the optical axis. The fifth lens unit L5 is thus arranged to be driven by a driving part which is composed of magnets and coils. A filter frame 122 is secured with screws to the rectilinear motion tube 112.

A bayonet part is provided on the front periphery of the filter frame 122 while a thread part is formed on the inner side of the filter frame 122 to permit a hood, a filter or some other accessory to be mounted there. Further, the first lens unit holding frame 123 which holds the first lens unit L1 is secured to the filter frame 122 with screws.

The abutting parts of the filter frame 122 and the first lens unit holding frame 123 are respectively formed to have slanting surfaces. A mounting position with respect to the filter frame 122 of the first lens unit holding frame 123 in the direction of the optical axis is adjustable with the first lens unit holding frame 123 thus arranged to be mounted on the filter frame 122 by rotating the first lens unit holding frame 123. By virtue of this arrangement, a focus position discrepancy between a wide-angle end and a telephoto end due to some manufacturing error can be adequately corrected.

A decorative ring 124 has some indication such as a lens name or the like printed on its front side.

A focus unit 125 is secured to the guide tube 107 with screws. The focus unit 125 is composed mainly of a vibration wave motor and a differential mechanism and is arranged to output a rotation amount of a focus key 127 according to the rotation amount of the rotor of the vibration wave motor or the rotation amount of a manual ring 126.

A pair of oscillatory gyros 128 arranged to detect angular velocities of vibrations in horizontal and vertical directions are soldered to a gyro base plate 129. The gyro base plate 129 is secured to the front side of the focus unit 125 with screws through a rubber damper (not shown).

An encoder flexible circuit board 130 having a gray code pattern formed thereon is stuck to the outer side of a projection which arcuately extends from the focus unit 125. The focus unit 125 has another projection on its front side at a part where the oscillatory gyros 128 and the encoder flexible circuit board 130 are not located. A roller 131 is secured to this projection with a screw.

A zoom operation ring 132 has a groove formed in the circumferential direction thereof. The roller 131 engages this groove to make the zoom operation ring 132 rotatable around the optical axis but not movable in the direction of the optical axis. The zoom operation ring 132 is provided with a recessed part which is formed on its inner side to engage a zoom key 133 which is secured to the cam tube 108 with a screw. The cam tube 108 is thus arranged to be rotatable together with the zoom operation ring 132 through the zoom key 133.

An intermediate tube 134 is provided with a projection which is formed on the outer side of the intermediate tube 134 to engage a groove formed on the inner side of the zoom operation ring 132 to extend in the direction of the optical axis and a lead groove which is formed on the inner side of the intermediate tube 134 to engage a projection formed on the outer side of the filter frame 122. The intermediate tube 134 is thus arranged to rotate together with the zoom operation ring 132 and to move back and forth in the direction of the optical axis according to the rotating position of the zoom operation ring 132 and the position of the filter frame 122 in the optical axis direction.

The interchangeable lens in the first embodiment is arranged to have the vibrations generated by the camera body (such as vibrations caused by the travels of shutter curtains, upward and downward motions of a mirror, etc.) not readily transmitted to the oscillatory gyros 128 by locating the gyros 128 away from the camera body, i.e., in front of the focus unit 125. Such an arrangement obviates the necessity of adaption of the conventional method of having the oscillatory gyros within a casing. Further, a part restricting the position of the zoom operation ring 132 in the direction of the optical axis is disposed at a phase position where the oscillatory gyros 128 are not located, so that the oscillatory gyros 128 can be arranged without increasing the outer diameter of the lens barrel. The interchangeable lens, therefore, can be compactly arranged by virtue of this arrangement.

A zoom rubber part 135 is wound around the outer side of the zoom operation ring 132. A name ring 136 is elastically connected to the fore end part of the zoom operation ring 132. A zoom brush 137 which is attached to the zoom operation ring 132 with a screw is arranged to slide over the gray code pattern of the encoder flexible circuit board 130 and to be used for detecting a positional relation between the zoom operation ring 132 and the encoder flexible circuit board 130.

An inner cam tube 138 is provided with a roller 139 secured thereto through a coiled spring. The roller 139 is arranged to engage a cam groove formed in the guide tube 107 and a groove formed in the cam tube 108 to extend in the direction of the optical axis. The inner cam tube 138 is thus arranged to move back and forth in the direction of the optical axis while it is rotating together with the cam tube 108.

A second lens unit holding frame 140 which holds the second lens unit L2 has a projection formed on its outer side to engage a cam groove which is formed on the inner side of the inner cam tube 138. A key part which extends from the second lens unit holding frame 140 engages the focus key 127 in such a way as to rotate together with the focus key 127.

When the cam tube 108 rotates (with the focus key 127 in repose), therefore, the second lens unit holding frame 140 moves back and forth in the direction of the optical axis to the extent of a sum of an amount to which the inner cam tube 138 moves in the optical axis direction and an amount of change in the optical axis direction of its engaging point at the cam groove of the inner cam tube 138 resulting from the rotation of the cam groove. When the focus key 127 rotates (with the cam tube 107 in repose), the second lens unit holding frame 140 moves, while rotating, back and forth according to the amount of change in the optical axis direction of the point where it engages the cam groove of the inner cam tube 138.

The interchangeable lens is thus arranged to allow the second lens unit L2 to move back and forth in the direction of the optical axis by mechanically correcting a focal position deviation caused by a change of focal length occurring in a state of inner focus.

A graduation sheet 141 is arranged to rotate in one body with the focus key 127 which is the output part of the focus unit 125 and to indicate a focus position in conjunction with the graduation window 104.

A main circuit board 142 is provided for control of varied kinds and is electrically connected to the focus unit 125, the electromagnetic diaphragm unit 117, the image-shake correcting unit 111, the gyro base plate 129 and the encoder flexible circuit board 130 either directly or indirectly through a flexible board.

A contact block 143 is secured to the mount 101 with a screw and is connected to the main circuit board 142 through a flexible board. The contact block 143 is provided for communication with the camera body and also for supply of power. A back cover 144 is elastically coupled with the mount 101 to cut deleterious light.

With the interchangeable lens arranged in this manner, the cam tube 108 is caused to rotate through the zoom key 133 when the zoom operation ring 132 is rotated. The rotation of the cam tube 108 then causes the mechanism described above to move all the lens units L1 to L6 back and forth in the direction of the optical axis to carry out zooming. In this instance, the third and sixth lens units L3 and L6 move together with each other.

In adjusting the focus of the lens, the focus key 127 is caused to rotate by the driving action of the vibration wave motor in the case of automatic focusing and by the rotation of the manual operation ring 126 in the event of manual focusing. With the focus key 127 rotated, the mechanism described above causes the second lens unit L2 to move back and forth for focusing.

Further, in performing an image-shake correcting action, the image-shake correcting unit 111 is controlled according to the outputs of the oscillatory gyros 128 and the output of the encoder flexible circuit board 130 in such a way as to move the fifth lens unit L5, within a plane orthogonally intersecting the optical axis, in the direction of offsetting any movement of an image on the film surface being caused by vibrations.

Figure 4:
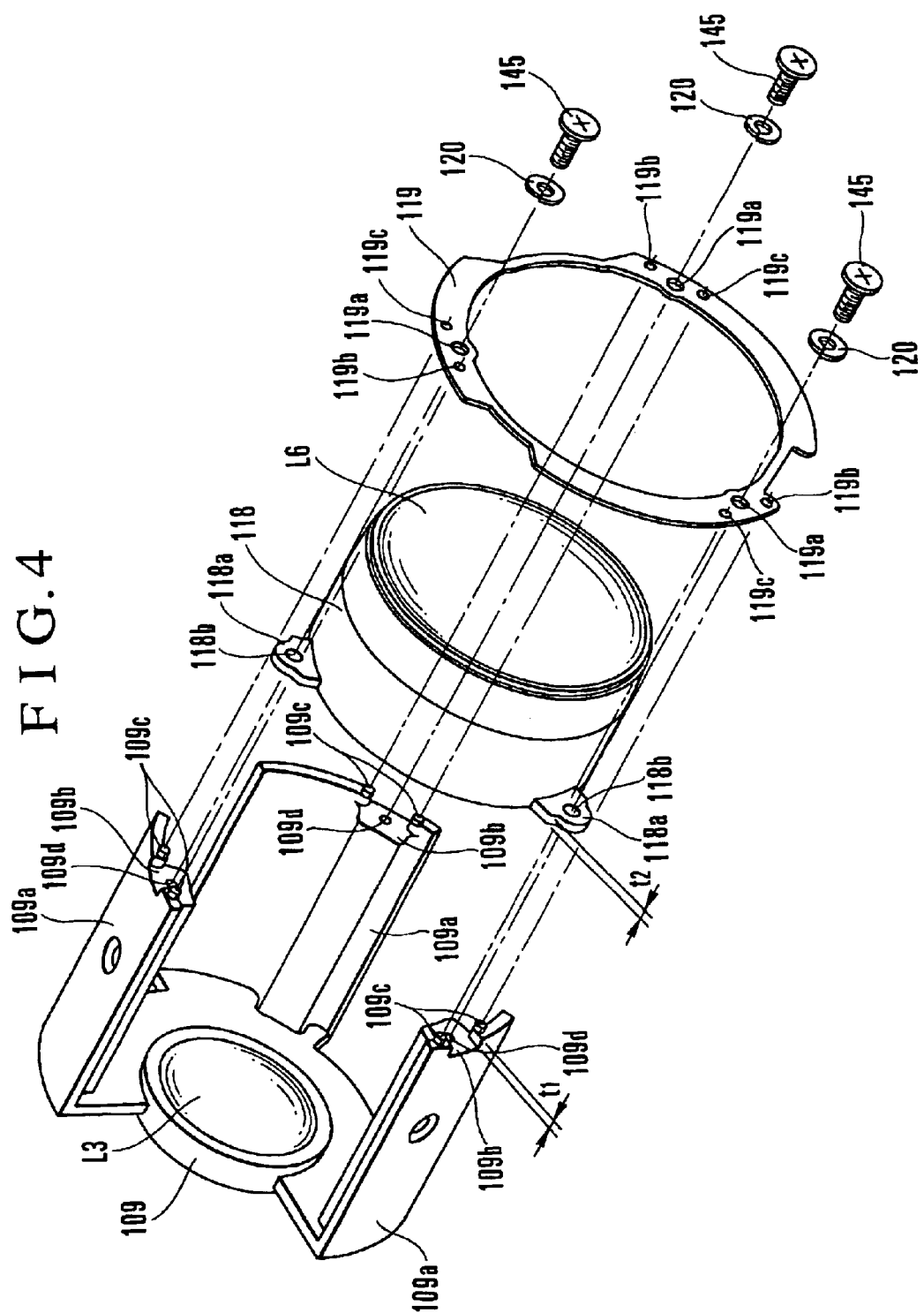
FIG. 4 is an exploded perspective view showing the structural arrangement of a lens holding device included in the interchangeable lens shown in FIG. 3.

The arrangement of the lens-holding mechanism which integrally holds and interlinks the third and sixth lens units L3 and L6 is next described in detail with reference to FIG. 4. In the case of the lens-holding mechanism, assembly work is performed in the following manner. Before assembling the mount 101, the exterior ring 103, the manual ring 126, the main circuit board 142, the back cover 144 and parts secured to these parts, the fixed tube 102 is fixed to an adjustment tool body (not shown), and the sixth lens holding frame (a second holding member) 118 which is holding the sixth lens unit L6 is mounted on the third lens unit holding frame (a first holding member) 109 by adjusting its position in the direction orthogonally intersecting the optical axis, with the fixed tube 102 in the state of being fixed to the adjustment tool body.

By this, deterioration in optical performance due to manufacturing errors of the first to sixth lens units L1 to L6 and parts holding them can be corrected for obtaining a desired optical performance.

The third lens unit holding frame 109 has three leg parts 109a which extend from a tubular part holding the third lens unit L3 through a flange part toward the rear end of the lens barrel. As shown in FIG. 4, each of the three leg parts 109a has an abutting face 109b abutting on the sixth lens unit holding frame 118, a lower screw hole 109d and a pair of round stud-like projections 109c.

The sixth lens unit holding frame 118 has flange parts 118a formed on the outer side of its tubular part holding the sixth lens unit L6 at three positions which correspond to the abutting faces 109b and the lower screw holes 109d of the third lens unit holding frame 109. The flange parts 118a are respectively provided with abutting faces for abutting on the third lens unit holding frame 109 and screw holes 118b.

The reinforcement plate 119 which is a deformation restricting and friction preventing member has a hollow approximately-circular ring shape. A screw hole 119a, a round hole 119b and a slot 119c are formed in each of three parts of the reinforcement plate 119 corresponding to the lower screw hole 109d and the round stud-like projections 109c of the third lens unit holding frame 109.

The lens holding mechanism which is composed of these parts are assembled in the following manner. The flange parts 118a of the sixth lens holding frame 118 are first abutted on the abutting faces 109b of the third lens unit holding frame 109. Then, with the reinforcement plate 119 set on the flange part 118a of the sixth lens unit holding frame 118, the sixth lens unit holding frame 118 is secured to the third lens unit holding frame 109 by means of self-tapping screws 145 at three parts with the spring washers 120 (urging members) mounted around the threaded shaft parts of these screws 145.

Next, the optical axis deviation of the lens holding mechanism according to the first embodiment is corrected while the mechanism is in a state in which each of the screws 145 is tightened halfway, i.e., while the sixth lens unit holding frame 118 is not completely secured to the third lens unit holding frame 109, although the sixth lens unit holding frame 118 is being pushed against the third lens unit holding frame 109 by the spring force of the spring washer 120 (in the process of coupling).

Figure 1:
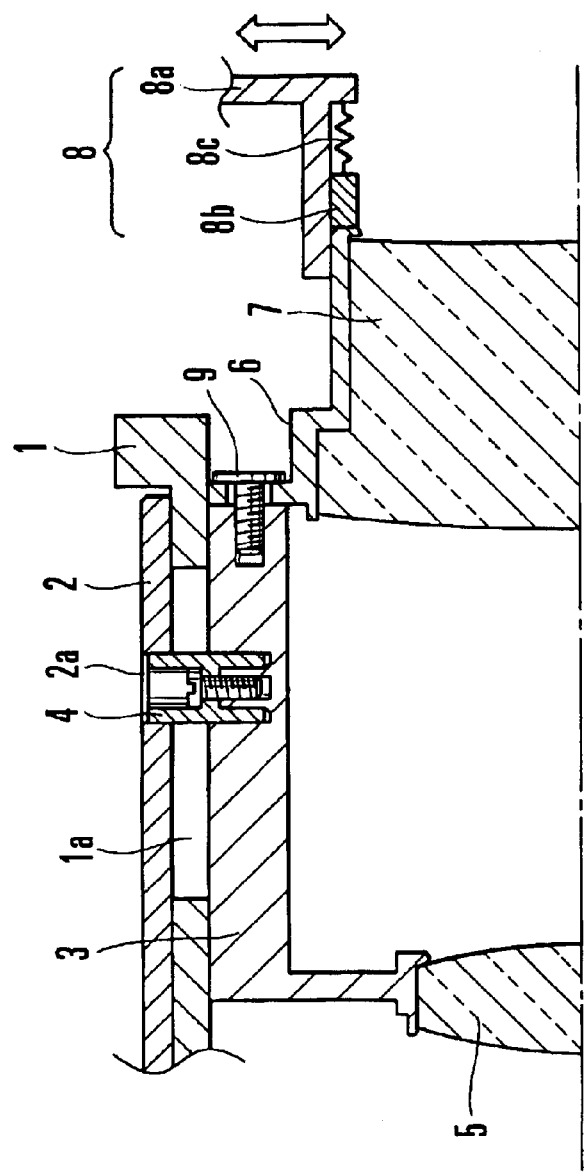
FIG. 1 is a sectional view showing a method for correcting an optical axis deviation of a lens holding mechanism of a conventional interchangeable lens adapted for a single-lens reflex camera.
Figure 2:
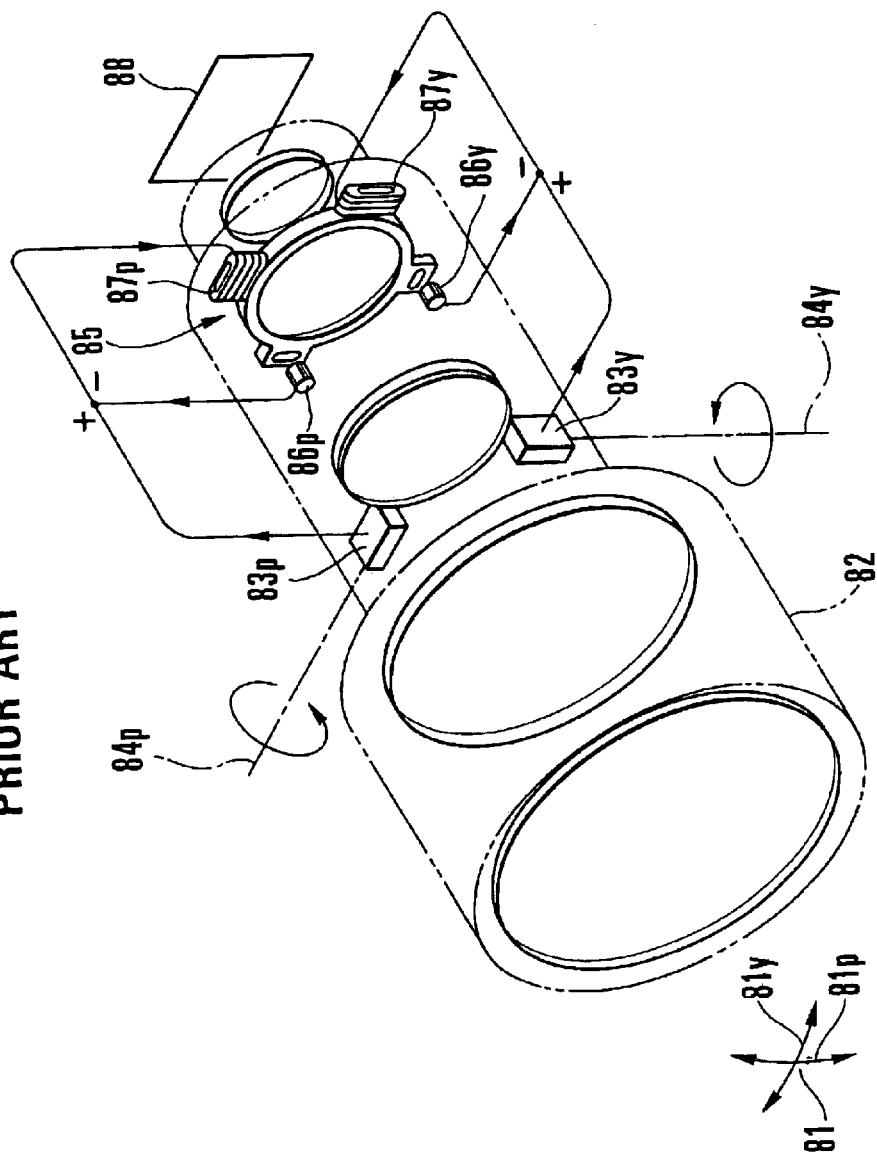
FIG. 2 is a perspective view showing the arrangement of a conventional image-shake correcting device.

An adjustment tool (not shown) which corresponds to the conventional adjustment ring 8a shown in FIG. 1 is attached to the sixth lens unit holding frame 118. The sixth lens unit holding frame 118 is arranged to be movable within a plane orthogonally intersecting the optical axis through the adjustment tool.

Each of the screw holes 118b of the sixth lens unit holding frame 118 is arranged to have a larger diameter than the outside diameter of the threaded shaft part of the corresponding screw 145, so that the sixth lens unit holding frame 118 can be moved as much as a maximum amount of correction anticipated to be necessary.

The protruding amount t1 of the root part of each of the round stud-like projections 109c in the direction of the optical axis with respect to the abutting face 109b of the third lens unit holding frame 109 is arranged to be in a relation of "t1<t2" to the thickness t2 of the flange part 118a of the sixth lens unit holding frame 118. Therefore, the spacing distance in the direction of optical axis between the third lens unit L3 and the sixth lens unit L6 can be accurately and reliably decided by pushing the sixth lens holding frame 118 against the third lens unit holding frame 109 through the reinforcement plate 119.

Further, the reinforcement plate 119 can be positioned within an optical-axis correction plane, i.e., a relative-position varying plane, for the third and sixth lens unit holding frames 109 and 118 by fitting the round stud-like projections 109c of the three leg parts 109a of the third lens unit holding frame 109 into the round holes 119b and the slots 119c of the reinforcement plate 119. Besides, the deformation of the leg parts 109a of the third lens unit holding frame 109 can be restricted also by this arrangement. The reinforcement plate 119 is thus arranged to be movable together with the third lens unit holding frame 109 and the sixth lens unit holding frame 118.

The lens holding mechanism according to the first embodiment is arranged, as described above, to permit the sixth lens unit holding frame 118 to be moved with respect to the third lens unit holding frame 109 in the direction orthogonally intersecting the optical axis, for correcting an optical axis deviation, in a state of determining a distance between the sixth and third lens unit holding frames 118 and 109 by means of the spring force of the spring washer 120 while the screws 145 are tightened only halfway for coupling the sixth lens unit holding frame 118 with the third lens unit holding frame 109. By this arrangement, the optical axis deviation can be accurately corrected because, unlike the prior art arrangement, no parts are deformed by the exertion of force from outside by an adjustment tool such as the one shown in FIG. 1.

The invention is not limited to the arrangement of the first embodiment described above. The arrangement disclosed may be variously changed. For example, if a sufficient space is available, the spring force of the spring washer 120 may be changed to be generated at some suitable position other than the position located beneath the screw 145. The position of the spring washer 120 and that of the reinforcement plate 119 may be interchanged. Further, the spring washers 120 may be replaced with some elastic or resilient parts such as Belleville springs, wave washers, coiled springs or rubber parts.

Some frictional force is generated between the threaded shaft part of each screw 145 and the lower screw hole 109d of the third lens unit holding frame 109 and between the head part of the screw 145 and the flange part 118a of the sixth lens unit holding frame 118 when the screw 145 is tightened. Another frictional force is also generated at the abutting face 109b in moving the sixth lens unit holding frame 118 with respect to the third lens unit holding frame 109 in the direction orthogonally intersecting the optical axis. These frictional forces tend to deform or distort the leg parts 109a of the third lens unit holding frame 109 and also distort the flange parts 118a of the sixth lens unit holding frame 118. In the case of the lens holding mechanism according to the first embodiment, such deformation and distortion are prevented as follows.

The deformation and distortion of the leg parts 109a of the third lens unit holding frame 109 due to the frictional force generated between the threaded shaft part of the screw 145 and the lower screw hole 109d of the third lens unit holding frame 109 and between the abutting faces of the sixth and third lens unit holding frames 118 and 109 are prevented by restricting the deformation of the leg parts 109a with the reinforcement plate 119.

The distortion of the flange parts 118a of the sixth lens unit holding frame 118 due to the frictional force generated between the head parts of the screws 145 and the flange parts 118a of the sixth lens unit holding frame 118 is prevented by inserting the reinforcement plate 119 in between the third lens unit holding frame 109 and the sixth lens unit holding frame 118 in such a way as to restrict the generation of the frictional force to a part between the reinforcement plate 119 and the screws 145.

Further, in accordance with the invention, the reinforcement plate 119 is not absolutely necessary and may be used only in a case where it is necessary. If other parts in the first embodiment have sufficient strength, the reinforcement plate 119 is dispensable.

The arrangement of the first embodiment disclosed also may be changed to provide deformation preventing members separately and individually against different factors of deformation of parts. It is also possible to prevent the generation and transmission of a frictional force by inserting some part that has a low coefficient of friction such as a Teflon sheet or the like in addition to the use of the deformation preventing member.

As described above, the first embodiment is arranged to decide a spacing distance between the optical elements held by the first and second holding members by means of the urging force of an urging member disposed inside of the apparatus between a coupling member and the second holding member, while these optical elements are in the process of correcting an optical axis deviation. Unlike the arrangement of the prior art described in the foregoing, the arrangement of the first embodiment permits accurate correction of the optical axis deviation, without causing any part to be deformed by an urging force of an adjustment tool applied from outside of the apparatus.

The disclosed arrangement for providing a member for restricting the deformation of the first holding member effectively prevents the optical axis deviation correcting accuracy from being deteriorated by the deformation of the first holding member.

The disclosed arrangement for providing a member for preventing generation of a frictional force between the coupling member and the second holding member effectively prevents the optical axis deviation correcting accuracy from being deteriorated by the deformation of the second holding member.

In the above-stated case, the arrangement for restricting the movement of the friction preventing member with respect to the first holding member to a plane on which relative positions of the first and second holding members are variable enables the friction preventing member to form a movable part together with the first and second holding members.

Further, with the friction preventing member arranged to be used also as a deformation restricting member and with the urging member disposed between the coupling member and the friction preventing member, the deformation of parts can be efficiently prevented without necessitating any complex structural arrangement.

(Second Embodiment)

Figure 5:
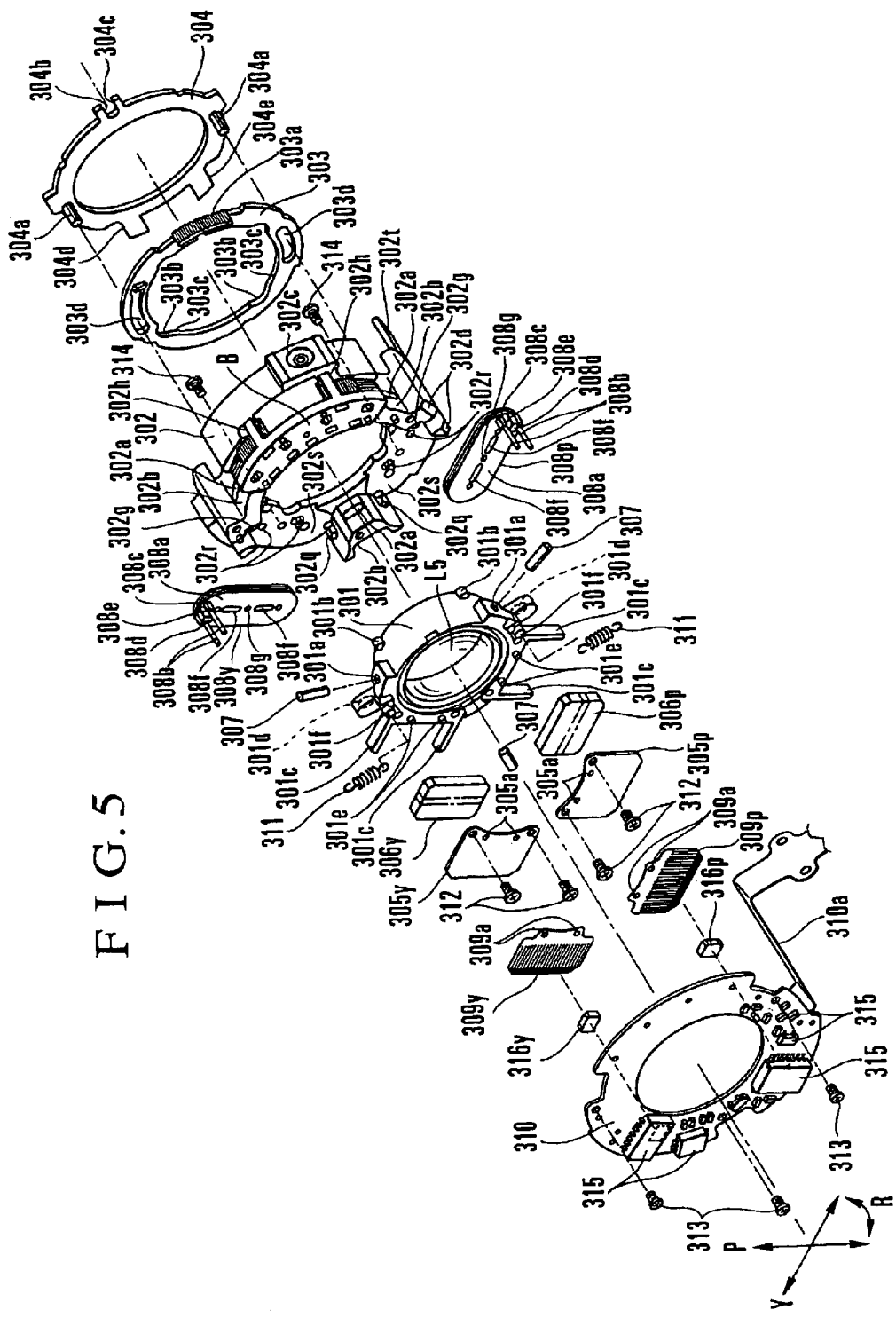
FIG. 5 is an exploded perspective view showing an image-shake correcting device according to a second embodiment of the invention.
Figure 6:
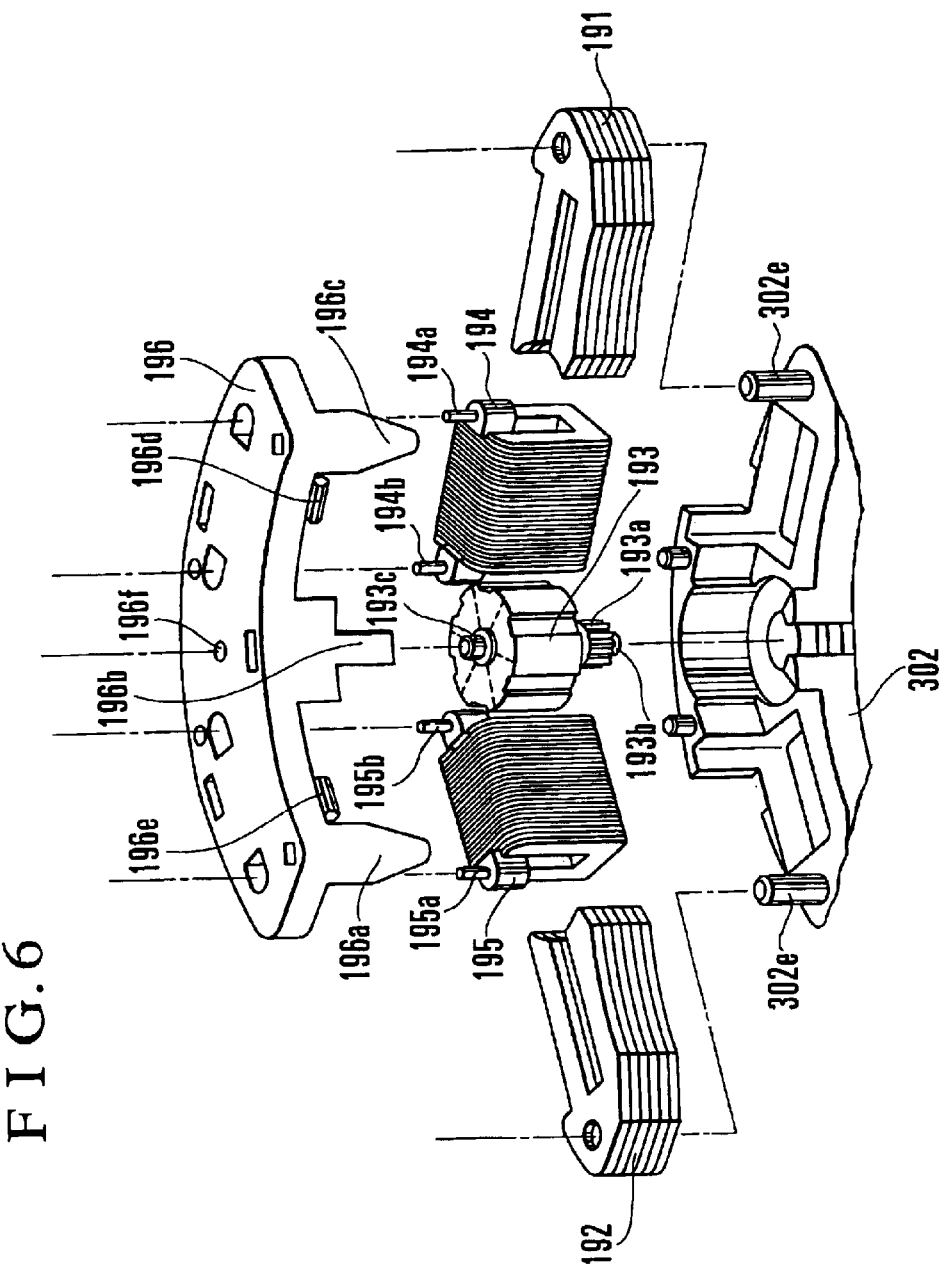
FIG. 6 is an exploded perspective view showing a stepping motor part of the same image-shake correcting device.
Figure 7:
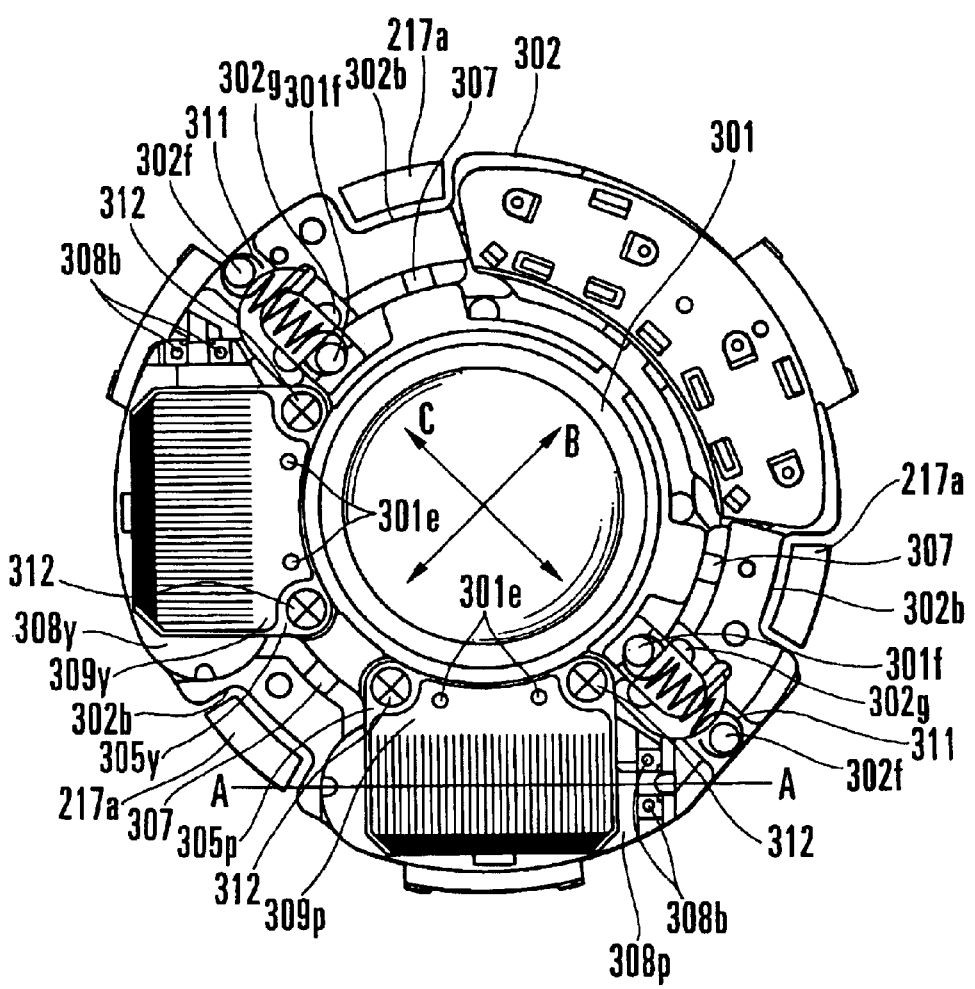
FIG. 7 is a front view showing the same image-shake correcting device.
Figure 8:
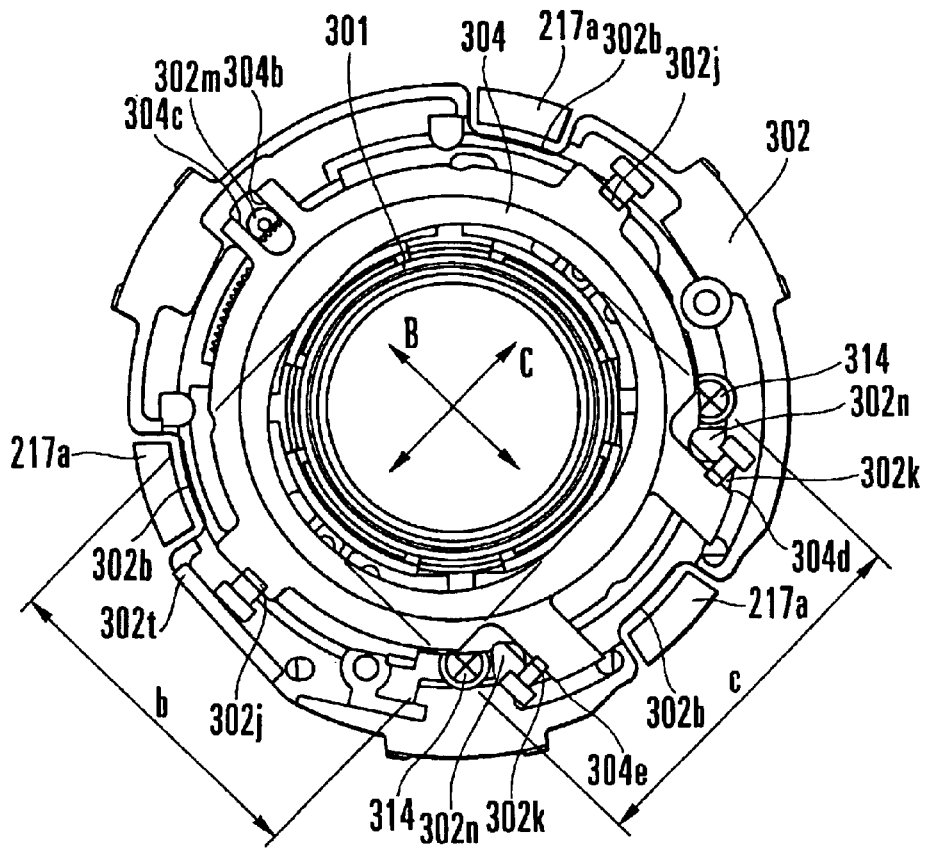
FIG. 8 is a rear view showing the same image-shake correcting device.
Figure 9:
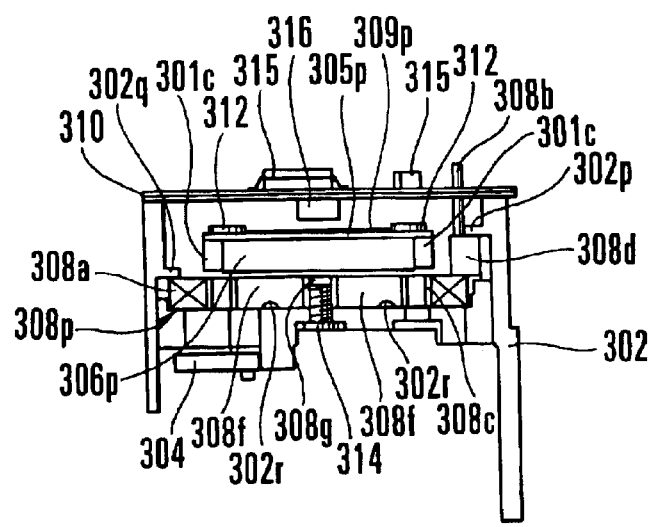
FIG. 9 is a sectional view taken along a line A—A shown in FIG. 7.
Figure 10:
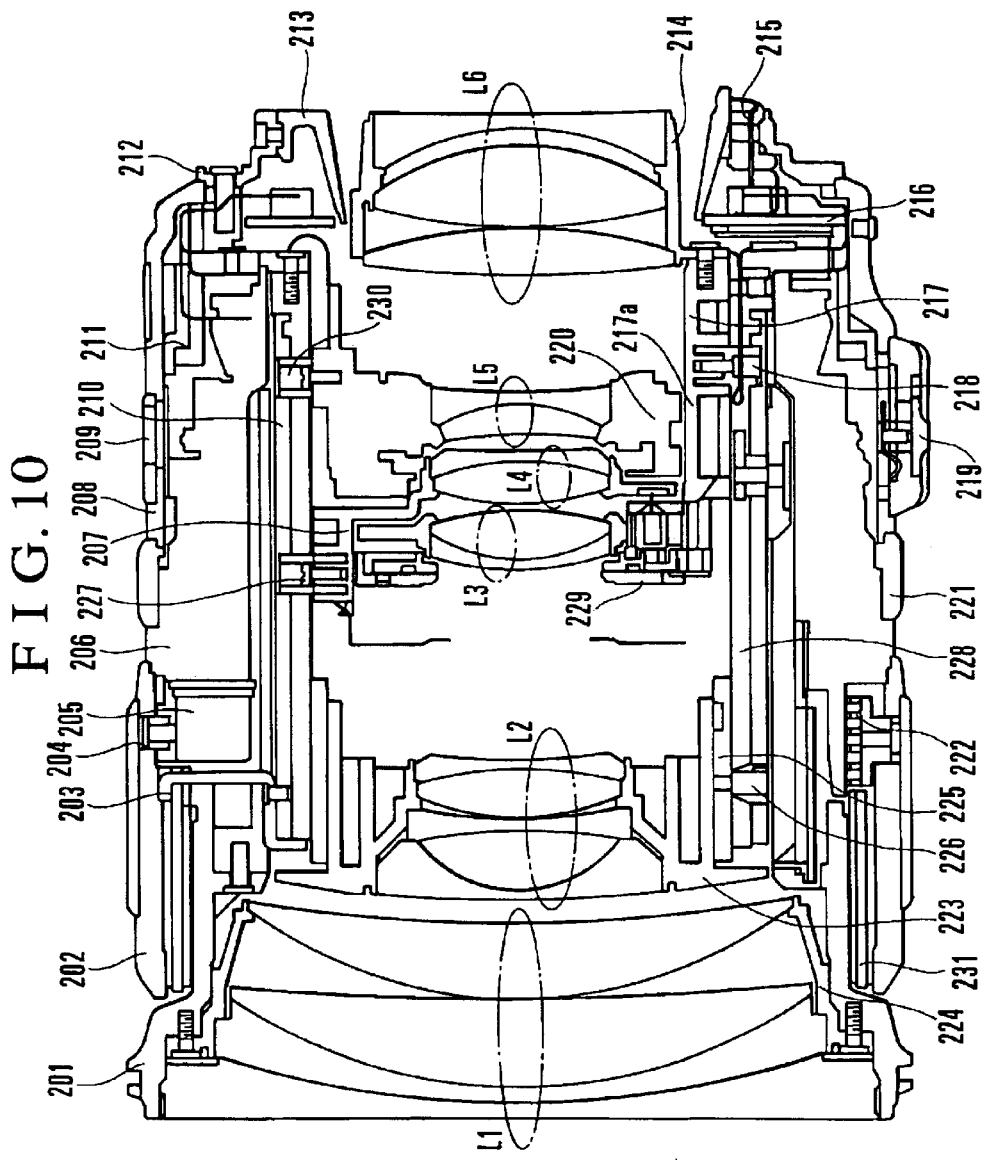
FIG. 10 is a sectional view of a lens barrel in which the same image-shake correcting device is mounted.

FIGS. 5 to 10 relate to an image-shake correcting device and a lens barrel (an optical apparatus) having the same, according to a second embodiment of the invention. FIG. 5 shows in an exploded perspective view the essential parts of the image-shake correcting device. FIG. 6 is an exploded perspective view of a stepping motor shown at a part B in FIG. 5. FIG. 7 shows the internal arrangement of the image-shake correcting device as viewed from the left side of FIG. 5 (with a flexible circuit board 310 removed). FIG. 8 shows the image-shake correcting device as viewed from the direction opposite to the viewing direction of FIG. 7. FIG. 9 is a sectional view taken across a line A—A of FIG. 7. FIG. 10 is a sectional view showing the lens barrel in its entirety.

Referring first to FIGS. 5 to 8, the arrangement of the image-shake correction device is first described as follows. A correction lens L5 is held by a holding frame 301 and is arranged to correct an image shake by moving with respect to a base plate (a structural member of the lens barrel body) on a plane orthogonally intersecting an optical axis. The base plate 302 has sliding cams 302a which are located on one and the same plane orthogonally intersecting the optical axis.

Sliding pins 307 are arranged to be press-fitted through the sliding cams 302a into holes 301a which are formed in the holding frame 301 at three parts. The holding frame 301 has its position relative to the base plate 302 restricted in the direction of the optical axis but is arranged to be movable in all directions on the plane orthogonally intersecting the optical axis.

The sliding cams 302a are formed on the inner sides of three recessed parts 302b of the base plate 302 where the outer diameter of the base plate 302 is decreased by one step. Holding holes 302c are formed in three parts of the periphery of the base plate 302. The image-shake correcting device can be set within the optical apparatus (lens barrel) by inserting members such as rollers 230, etc., into the holding holes 302c.

Magnets 306p and 306y are magnetically coupled with yokes 305p and 305y. The yokes 305p and 305y are secured to the holding frame 301 respectively with screws 312 in positions set according to pitch (vertical) and yaw (horizontal) directions. The magnets 306p and 306y are inserted in between arm parts 301c which prevent positional deviations of the magnets 306p and 306y with respect to the holding frame 301.

Coil units 308p and 308y which are lens driving means are secured with screws to the base plate 302 at positions where they are opposed respectively to the magnets 306p and 306y. The coil units 308p and 308y are assembled in a manner described hereinafter.

The coil unit 308p is composed of a coil frame 308a which is made of a resin material and a winding coil 308c which is wound around the coil frame 308a as one unified body. To unify it, two terminals of the winding coil 308c are connected to terminal pins 308b which are conductive members and press-fitted into first stepped parts 308e of the coil frame 308a. The terminal pins 308b pierce through a flexible circuit board 310 and are electrically connected by soldering to the flexible circuit board 310 which will be described later. The other coil unit 308y is also arranged in the same manner.

With the image-shake correcting device arranged in this manner, image shakes can be corrected by applying currents to the coil units 308p and 308y to drive the correction lens L5 and the holding frame 301 in the pitch (P) and yaw (Y) directions.

The pitch (vertical) direction and the yaw (horizontal) direction are detected by dividing vibrations of the optical apparatus into pitch and yaw components by a vibration detecting means such as a vibration gyro or the like (not shown).

As apparent from FIG. 7, in the case of the second embodiment, the coil units 308p and 308y and a stepping motor are disposed on the opposite sides of the base plate 302 across the optical axis within the same plane which orthogonally intersects the optical axis. Therefore, three recessed parts 302b can be formed respectively between the coil unit 308p and the stepping motor, between the stepping motor and the coil unit 308y and between the coil units 308p and 308y.

Then, lens-unit connecting members 217a which interlink lens units disposed before and after the image-shake correcting device in the direction of the optical axis, as will be described later, can be placed within these three recessed parts 302b for reduction in size of the lens barrel in the direction of its diameter.

A lock ring (lock member) 303 is rotatably mounted on the base plate 302. The lock ring 303 is arranged to be rotated on the optical axis to lock and unlock the holding frame 301 by transmitting to a gear part 303a the output of a stepping motor which is disposed at a part B of FIG. 5. The arrangement and the action of this stepping motor and the action of the lock ring 303 will be described later.

A rotation restricting member 304 has two shaft parts 304a which extend in the direction of the optical axis. The shaft parts 304a extend through hole parts 303d formed in the lock ring 303 and hole parts 302g formed in the base plate 302 and are slidably fitted into slot parts 301d formed in the holding frame 301 to extend in the direction of the lens diameter. The rotation around the optical axis (in the direction of arrow R) of the holding frame 301 is thus restricted.

A flexible circuit board 310 is composed of a plurality of laminated conductive layers and is secured to the base plate 302 with screws 313. Photo-reflectors 316p and 316y which are arranged on the flexible circuit board 310 on the side of the holding frame 301 respectively to detect moving positions in the directions of pitch and yaw. A plurality of electrical elements 315 are arranged on the other side of the flexible circuit board 310 to form a position detecting circuit, etc.

Holes are formed in the flexible circuit board 310 to permit the terminals 194a, 194b, 195a and 195b of the stepping motor and the terminals 308b of the coil units 308p and 308y to pierce therethrough for soldering.

The flexible circuit board 310 has an extension part 310a arranged to be connected to another circuit board. To prevent interference with other parts, the extension part 310a is secured by means of some double-coated adhesive tape or the like to a protruding part 302t of the base plate 302 extending in the direction of the optical axis. The base plate 302 has chamfered parts 302d which are arranged to prevent the bent part of the extension part 310a from having stress.

Position-detecting target members 309p and 309y are secured to yokes 305p and 305y by bonding. Black-and-white patterns are printed on the target members 309p and 309y in such a way as to have the outputs of the photo-reflectors 316p and 316y vary at a fixed rate according to the motion of the holding frame 301. The positions of the target members 309p and 309y and those of the yokes 305p and 305y with respect to the holding frame 301 are determined by fitting dowels 301e of the holding frame 301 respectively into holes 309a and 305a.

An assistant spring 311 is provided for assisting the prevention of the correction lens L5, the holding frame 301, etc., from being damaged and the return of them to their center positions. For this purpose, the hook parts of two ends of the spring 311 are hooked respectively on a hook part 302f of the base plate 302 and a hook part 301f of the holding frame 301.

The stepping motor which is provided for driving the lock ring 303 is next described with reference to FIG. 6. This stepping motor is in a unified state as shown at the part B in FIG. 5.

Referring to FIG. 6, a stator yoke 191 is formed as one of two stator yokes by laminating a plurality of (six in this case) soft magnetic plates of the same shape into one unit. Another stator yoke 192 is identical with the stator yoke 191 and is arranged to be the other stator yoke of the stepping motor which is of a two-phase type. The stator yoke 192 is used in a state of setting it upside-down with respect to the stator yoke 191.

A rotor 193 is made of a plastic magnet and is arranged to be driven to rotate by exciting it through the stator yokes 191 and 192. The periphery of the rotor 193 is magnetized to alternately have different magnetic poles in a divided manner and also to have anisotropic orientation. A gear 193a is arranged integrally with the rotor 193 to transmit its rotation to the gear part 303a of the lock ring 303.

Coils 194 and 195 are arranged respectively to excite the stator yokes 191 and 192. The coils 194 and 195 are composed of the same parts. When the coils 194 and 195 are energized through connection terminals 194a, 194b, 195a and 195b, they respective excite the stator yokes 191 and 192. The stator yokes 191 and 192 are positioned respectively by shafts 302e provided on the base plate 302. The rotation shaft 193b of the rotor 193 is rotatably carried by the base plate 302.

A motor case cover 196 has a hole 196f which is arranged to allow the rotation shaft 193c of the rotor 193 to be rotatably fitted therein. The motor case cover 196 also has claw parts 196a to 196e which are arranged to be respectively hooked into groove parts 302h of the base plate 302 in mounting the motor case cover 196 on the base plate 302.

The stepping motor operates as follows. When the coil 194 or 195 is energized through the connection terminals 194a and 194b or the connection terminals 195a and 195b, magnetic fields are generated in the stator yokes 191 and 192 to form a closed magnetic path by interacting with the magnetic field of the magnet rotor 193. In this instance, if the coil 195 is not energized, a magnetic path generated by the coil 194 becomes dominant to generate a rotation torque which causes the magnet rotor 193 to rotate in one direction. If the coil 194 is not energized, a magnetic path generated by the other coil 195 becomes dominant to generate a rotation torque which causes the magnet rotor 193 to rotate in the other direction. Further, in a case where both the coils 194 and 195 are energized, magnetic paths are also formed respectively at the stator yokes 191 and 192. Then, the magnetic fields thus generated interact with the magnetic field of the magnet rotor 193 to impart a rotation torque to the magnet rotor 193.

Therefore, the stepping motor can be driven to perform its action by energizing the two coils 194 and 195 one after another by switching the direction of current from one direction over to the other. Then, the lock ring 303 can be rotated a predetermined angle by transmitting the rotation of the magnet rotor 193 to the lock ring 303 through the gear part 193a and the gear part 303a.

Cams 303b are formed at four parts on the inner side of the lock ring 303. The holding frame 301 is locked and unlocked by causing the four cams 303b to engage and disengage projections 301b which are provided at four parts of the holding frame 301 (only two of them are shown in FIG. 5). More specifically, when the lock ring 303 is rotated counterclockwise, as viewed on the side of the base plate 310, the cam parts 303b part from the projections 301b to liberate the holding frame 301 from the lock ring 303 into an unlocked state. When the lock ring 303 is rotated clockwise, on the other hand, the innermost circumferential parts 303c of the cam parts 303b come to abut on the projections 301b to cause the holding frame 301 to engage the lock ring 303. As a result, the holding frame 301 is locked to the base plate 302.

Therefore, in correcting image shakes, the lock ring 303 is rotated counterclockwise by the stepping motor to unlock the holding frame 301. Upon completion of the image shake correction, the lock ring 303 is rotated clockwise to lock the holding frame 301 to the base plate 2.

However, with the image-shake correction driving performed in the above-stated manner, the holding frame 301 becomes movable not only in the pitch direction (P) and the yaw direction (Y), shown in FIG. 5, but also in the rotating direction (R). The rotation would deteriorate the accuracy of the image-shake correction. To minimize the adverse effect of the rotation, therefore, in the second embodiment, two shaft parts 304a are arranged to extend from the rotation restricting member 304, to pierce through holes 303d formed in the lock ring 303 and holes 302g formed in the base plate 302 and to be slidably fitted into slots 301d formed in the holding frame 301.

The movement of the rotation restricting member 304 in the direction of the optical axis is restricted by claws 302j and 302k which are arranged on the base plate 302 to engage the rotation restricting member 304. In addition to that, the sliding faces 304b, 304c, 304d and 304e of the rotation restricting member 304 are arranged to slidably engage the side faces of projections 302n arranged around a bearing part of the base plate 302 provided for bearing the shaft of the magnet rotor 193. By this arrangement, the rotation restricting member 304 is allowed to move only in the direction of arrow B as shown in FIG. 8.

With the second embodiment arranged in this manner, the holding frame 301 is no longer rotatable with respect to the base plate 302 and to be movable only in the pitch and yaw directions by the driving force obtained from the magnets 306p and 306y and the coil units 308p and 308y. More specifically, in the direction of arrow B shown in FIG. 8, the holding frame 301 is movable with respect to the base plate 302 together with the rotation restricting member 304. In the direction of arrow C which orthogonally intersects the direction of arrow B, the holding frame 301 is alone movable with respect to the base plate 302.

The rotation restricting member 304 is provided with an inner open part formed approximately in an elliptic shape which has a dimension "b" in the direction of arrow B arranged to be shorter than a dimension "c" in the direction of arrow C. This arrangement effectively blocks deleterious light coming through void spaces obtained accordingly as the holding frame 301 moves.

A method for assembling the coil units 308p and 308y is next described with reference to FIGS. 5, 7 and 9. Since the two coil units 308p and 308y are identical with each other, the following description covers only the coil unit 308p. The coil unit 308p is first inserted into the base plate 302 following the coil mounting face 302s of the base plate 302 from the direction orthogonally intersecting the optical axis. In overriding positioning projections 302r which are provided on the coil mounting face 302s of the base plate 302 to have two slanting faces, coil retaining parts 302p and 302q and the resin part of the coil unit 308p elastically deform.

When the coil unit 308p is inserted further, the positioning projections 302r come to enter slots 308f formed in the coil unit 308p between a mounting face and a flat wall part covering a magnet confronting face of the winding coil 308c. The coil unit 308p is thus positioned with respect to the base plate 302. After that, the coil unit 308p is pulled in and secured to the base plate 302 with a screw 314 which is inserted into a hole 308g from the reverse side (opposite to the side facing the circuit board 310) of the base plate 302.

In performing a driving action by means of the coil unit 308p and the magnet 306p like in the case of the second embodiment, an air space causes a great loss of magnetic intensity. Therefore, it is impossible to obtain a sufficiently large driving force unless a spacing distance between the coil unit 308p and the magnet 306p is narrowed. Therefore, to keep the spacing precision of this part at a high degree of precision, the coil retaining parts 302p and 302q are arranged on the base plate 302 to prevent the coil unit 308p from readily coming off the projections 302r. The provision of the coil retaining parts 302p and 302q also serves to prevent a warping deformation of the coil unit 308p when it is pulled in by the screw 314, so that the coil unit 308p can be prevented from interfering with the magnet 306p, etc.

The coil unit 308p is provided with a second stepped part 308d which is higher than the first stepped part 308e in two directions and has the terminal parts 308b press-fitted therein. The coil retaining part 302p is arranged to abut on the stepped part 308d for the purpose of preventing the coil 308c (having its end parts connected to the terminal parts 308b) from being broken in inserting the coil unit 308p.

The arrangement described above effectively enhances the assembly workability of the coil units 308p and 308y.

While the second embodiment is arranged to correct the positional deviation of the holding frame 301 in the direction of the optical axis through the engagement of the cams 302a and the pins 307, the arrangement may be changed to some other method. For example, the deviation may be corrected by using an urging force of a spring.

In the case of the second embodiment, the magnets 306p and 306y are mounted on the holding frame 301, and the coil units 308p and 308y are mounted on the base plate 302. However, this arrangement may be conversely changed to mount the coil units 308p and 308y on the holding frame 301 and mount the magnets 306p and 306y on the base plate 302.

Arrangement of a lens barrel in which the image-shake correcting device described above is included is next described in its entirety. The lens barrel is an interchangeable lens which is adapted for a single-lens reflex camera and is composed of six lens units L1 to L6. All the lens units L1 to L6 are arranged to be movable by a zooming action.

The second lens unit L2 is arranged to be moved by a focusing action. The third lens unit L3 and the sixth lens unit L6 are arranged to move together. The fifth lens unit (correction lens) L5 is arranged to be used for the image-shake correcting action to be performed as described above.

In FIG. 10, reference numeral 201 denotes a filter frame. A filter can be mounted on an inner thread part provided at the fore end of the filter frame 201. Some accessory such as a hood or the like can be mounted on a bayonet part provided on the outer side of the filter frame 201. The first lens unit L1 is held by the inner side of the filter frame 201.

A zoom operation ring 202 is arranged to be rotatable around the optical axis while its movement in the direction of the optical axis is restricted by thrust-position restricting rollers 204. A zoom key 203 is arranged to cause the zoom operation ring 202 to rotate together with the cam ring 210.

A cam ring 210 is provided with cam grooves (or slots). Rollers 226, 218, 227 and 230 are respectively mounted on the a second lens unit holding tube 222 holding the second lens unit L2, a third lens unit holding tube 217 which holds the third lens unit L3 and inseparably engages a sixth lens unit holding tube 214 holding the sixth lens unit L6, a fourth lens unit holding tube 207 holding the fourth lens unit L4 and the base plate 302 of the image-shake correcting device 220. The rollers 226, 218, 227 and 230 are engaging the cam grooves formed in the cam ring 210.

Therefore, when the zoom operation ring 202 is operated to rotate it, the cam ring 210 rotates to cause the second to sixth lens units L2 to L6 to move back and forth in the direction of the optical axis along the cam grooves of the cam ring 210.

With the zoom operation ring 202 rotated, a lead groove formed on the inner side of the zoom operation ring 202 causes an intermediate tube 231 to move back and forth in the direction of the optical axis. Then, the first lens unit L1 also moves back and forth in the direction of the optical axis together with the filter frame 201 which engages a cam groove formed in the inner side of the intermediate tube 231. Reference numeral 220 denotes the image-shake correcting device described in the foregoing. The image-shake correcting device 220 is connected to a main circuit board 215 through the flexible circuit board 310 shown in FIG. 5. Reference numeral 206 denotes a focusing unit. The focusing unit 206 is connected to the main circuit board 216 and is thus arranged to perform a focus adjustment driving action. This lens barrel is provided with a manual (operation) ring 221 which is arranged to permit manual focusing by operating it.

An exterior ring 208 is provided with a graduation window 209 and a switch 219 for turning on and off the image-shake correcting device 220. A fixed tube 211 has a guide tube 228 and a camera mount 212 connected thereto. The guide tube 228 has a rectilinear motion groove (or slot) to which the roller 230 of the image-shake correcting device 220 is slidably fitted. Reference numeral 213 denotes a back cover. A contact block 215 is provided for electrical connection and is connected to the main circuit board 216 through the flexible circuit board 310. A sub-cam ring 225 is arranged to vary the amount of focusing motion of the second lens unit L2 in the direction of optical axis according to the focal length of the lens barrel.

A diaphragm unit 229 is electrically connected to the main circuit board 216 through the flexible circuit board 310 and is secured to the third lens unit holding tube 217. An encoder part 222 is arranged to generate a zoom signal.

In this lens barrel, arm parts 217a which are formed at three parts of the third lens unit holding tube 217 (see FIGS. 7, 8 and 10) extend rearward in the direction of the optical axis through recessed parts 302b formed in the base plate 302 of the image-shake correcting device 220. The fore end parts of these arm parts 217a are connected to the sixth lens unit holding tube 214. The third and sixth lens unit holding tubes 217 and 214 are thus arranged to move back and forth together in the direction of the optical axis.

The outer diameter of the third lens unit holding tube 217 is equal to that of the image-shake correcting device 220. Both the third lens unit holding tube 217 and the image-shake correcting device 220 are slidably fitted inside the guide tube 228. In other words, the outer diameter of the lens barrel does not increase despite the arrangement which interlinks the lens tubes 217 and 214 disposed before and after the image-shake correcting device 220. Therefore, the size of the lens barrel in the direction of its diameter can be effectively prevented from being increased.

The second embodiment is arranged, as described above, to insert the members interlinking the lens holding tubes disposed before and after the image-shake correcting device into the recessed parts of the image-shake correcting device. It is also possible to have some other component members of the lens barrel, such as guide bars arranged to guide the movement of the image-shake correcting device in the direction of the optical axis, also inserted in the recessed parts.

In the case of the second embodiment, the invention is applied to an interchangeable lens which is adapted for a single-lens reflex camera and includes an image-shake correcting device. However, the invention is not limited to the optical apparatuses of that kind.

As mentioned above, the second embodiment is arranged to have recessed parts formed on the outer side of the body member of the image-shake correcting device for the purpose of inserting therein the interlinking members arranged to interlink optical elements disposed before and after the image-shake correcting device. By virtue of this arrangement, an optical system can be arranged to make the lens units disposed before and after the image-shake correcting device movable together and also to make the image-shake correcting device movable in the direction of the optical axis without increasing the outer diameter of the optical apparatus. Therefore, limitations imposed on the optical design can be lessened according to the arrangement of the invention.

According to the invention, a restricting part which restricts the movement of the lens in the direction of its optical axis is disposed at a part located on the inner side of the upper recessed part within an intrinsically dead space, and a lens driving means and a lock driving means are arranged approximately within one and the same plane orthogonally intersecting the optical axis. By virtue of this arrangement, an image-shake correcting device and, therefore, an optical apparatus having the same can be compactly arranged.

What is claimed is:
1. An optical-element holding mechanism comprising:
a first holding member that holds a first optical element;
a second holding member that holds a second optical element;
a plurality of coupling members that couple said first holding member and said second holding member so as to permit relative positions of said first holding member and said second holding member to be varied during a coupling operation;
a plurality of urging members, respectively disposed between each of said plurality of coupling members and said second holding member, that urge and press said second holding member against said first holding member at least during the coupling operation so as to permit alignment of respective optical axes of the first optical element and the second optical element during the coupling operation; and a member disposed between said plurality of coupling members and said second holding member that prevents deformation of said first holding member while relative positions of said first holding member and said second holding member are varied during the coupling operation, wherein the first holding member includes a plurality of stud portions and the member disposed between said plurality of coupling members and said second holding member includes a plurality of hole portions which receive the plurality of stud portions of the first holding member to prevent the deformation of the first holding member while relative positions of said first holding member and said second holding member are varied during the coupling operation.

2. An optical-element holding mechanism according to claim 1, wherein each coupling member is a screw that couples said first holding member and said second holding member by press contact.

3. An optical-element holding mechanism according to claim 2, wherein each urging member is a deformable washer that generates an elastic force, and through which a shaft of said screw pierces.

4. An optical-element holding mechanism according to claim 1, wherein each urging member is disposed between a coupling member and said member disposed between said plurality of coupling members and said second holding member.

5. An optical-element holding mechanism according to claim 1, wherein the member disposed between said plurality of coupling members and said second holding member also prevents generation of a frictional force between said coupling member and said second holding member during the coupling operation.

6. An optical-element holding mechanism according to claim 5, wherein movement of said friction preventing member within a plane of varying the relative positions of said first holding member and said second holding member is restricted.

7. An optical-element holding mechanism according to claim 5, wherein each urging member is disposed between a coupling member and said friction preventing member.

8. An optical apparatus comprising:
an apparatus body; and
an optical-element holding mechanism including:
a first holding member that holds a first optical element;
a second holding member that holds a second optical element;
a plurality of coupling members that couple said first holding member and said second holding member so as to permit relative positions of said first holding member and said second holding member to be varied during a coupling operation;
a plurality of urging members, respectively disposed between each of said plurality of coupling members and said second holding member, that urge and press said second holding member against said first holding member at least during the coupling operation so as to permit alignment of respective optical axes of the first optical element and the second optical element during the coupling operation; and a member disposed between said plurality of coupling members and said second holding member that prevents deformation of said first holding member while relative positions of said first holding member and said second holding member are varied during the coupling operation, wherein the first holding member includes a plurality of stud portions and the member disposed between said plurality of coupling members and said second holding member includes a plurality of hole portions which receive the plurality of stud portions of the first holding member to prevent the deformation of the first holding member while relative positions of said first holding member and said second holding member are varied during the coupling operation.

9. An optical-element holding mechanism comprising:

a first holding member that holds a first optical element;

a second holding member that holds a second optical element;

a plurality of coupling members that couple said first holding member and said second holding member so as to permit relative positions of said first holding member and said second holding member to be varied during a coupling operation;

a plurality of urging members, respectively disposed between each of said plurality of coupling members and said second holding member, that urge and press said second holding member against said first holding member at least during the coupling operation so as to permit alignment of respective optical axes of the first optical element and the second optical element during the coupling operation; and a deformation restricting member disposed between said plurality of coupling members and said second holding member that restricts deformation of said first holding member while relative positions of said first holding member and said second holding member are varied during the coupling operation;

wherein said deformation restricting member includes a plurality of first through hole portions for receiving said plurality of coupling members;

wherein said first holding member includes an extended portion extending in the direction of the optical axis of said first optical element, said extended portion including a plurality of abutting faces and a plurality of receiving portions for receiving the plurality of coupling members; and wherein said second holding member includes a plurality of flanges extending in a direction perpendicular to the optical axis, each flange abutting against one of said plurality of abutting faces of said first holding member, each flange including a second through hole portion for receiving a respective one of said plurality of coupling members.

10. An optical apparatus comprising:
an apparatus body; and
an optical-element holding mechanism including:
a first holding member that holds a first optical element;
a second holding member that holds a second optical element;
a plurality of coupling members that couple said first holding member and said second holding member so as to permit relative positions of said first holding member and said second holding member to be varied during a coupling operation;

a plurality of urging members, respectively disposed between each of said plurality of coupling members and said second holding member, that urge and press said second holding member against said first holding member at least during the coupling operation so as to permit alignment of respective optical axes of the first optical element and the second optical element during the coupling operation; and a deformation restricting member disposed between said plurality of coupling members and said second holding member that restricts deformation of said first holding member while relative positions of said first holding member and said second holding member are varied during the coupling operation;

wherein said deformation restricting member includes a plurality of first through hole portions for receiving said plurality of coupling members;

wherein said first holding member includes an extended portion extending in the direction of the optical axis of said first optical element, said extended portion including a plurality of abutting faces and a plurality of receiving portions for receiving the plurality of coupling members; and wherein said second holding member includes a plurality of flanges extending in a direction perpendicular to the optical axis, each flange abutting against one of said plurality of abutting faces of said first holding member, each flange including a second through hole portion for receiving a respective one of said plurality of coupling members.

* * * * *

UNITED STATES PATENT AND TRADEMARK OFFICE
CERTIFICATE OF CORRECTION

PATENT NO. : 6,738,198 B2
DATED : May 18, 2004
INVENTOR(S) : Seiichi Kashiwaba et al.

It is certified that error appears in the above-identified patent and that said Letters Patent is hereby corrected as shown below:

Column 4,
Line 1, "Beside," should read -- Besides, --.

Column 14,
Line 44, "respective" should read -- respectively --.

Column 17,
Line 19, "the a" should read -- a --.

Signed and Sealed this

Fourteenth Day of December, 2004

JON W. DUDAS
*Director of the United States Patent and Trademark Office*